Patented Feb. 5, 1952

2,584,429

UNITED STATES PATENT OFFICE 2,584,429

1,1-DIPHENYL-4-TERT.-AMINO-2-BUTYNE-1-OLS

Willard J. Croxall, Bryn Athyn, Pa., and John W. Dawson, Huntsville, Ala., assignors to Rohm & Haas Company, Philadelphia, Pa., a corporation of Delaware No Drawing. Application December 29, 1950, Serial No. 203,546

5 Claims. (Cl. 260—247.7)

This invention concerns 1,1-diphenyl-4-tert.-amino-2-butyne-1-ols and a method for the preparation of these compounds, which have the general formula

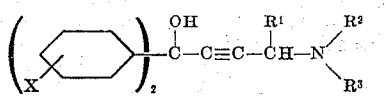

wherein X is hydrogen or a halogen or an alkyl, alkoxy, or similar neutral group, $R^1$ is hydrogen or an alkyl group, particularly an alkyl group of not over eight carbon atoms, and $R^2$ and $R^3$ are alkyl groups of not over two carbon atoms when taken individually and when taken together represent a saturated divalent group which together with the nitrogen atom forms a heterocycle.

These compounds are prepared by reaction of a benzophenone and an aminopropyne in the presence of an alkali metal hydroxide, thus

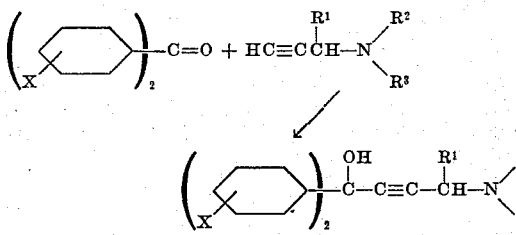

The reaction is performed by mixing the two reactants and alkali metal hydroxide between 0° and about 50° C., preferably in the presence of an inert anhydrous organic solvent, such as ethyl ether or isopropyl ether. The product is conveniently separated by pouring the reaction mixture into ice-water or upon crushed ice. The product separates as a solid which is filtered off and, if desired, recrystallized.

In an alternate method the alkaline catalyst used is an alkali metal amide and the reaction is carried out in liquid ammonia. Thus, an aminopropyne is mixed with sodamide in liquid ammonia and a benzophenone is added. Ammonia is evaporated. The reaction mixture is taken up in an inert solvent and hydrolyzed with water. The product is separated and, if desired, purified by recrystallization.

As a benzophenone, there may be used a symmetrical or unsymmetrical benzophenone. The phenyl groups thereof may be unsubstituted or substituted with a neutral substituent such as a halogen or an alkoxy, alkyl, or similarly inert atom or group. Of particular interest are benzophenone itself and benzophenones having methyl, methoxy, chloro, and bromo substituents.

Aminopropynes which are useful include 3-dimethylaminopropyne, 3-diethylaminopropyne, 3-morpholinopropyne, 3-piperidinopropyne, 3-pyrrolidinopropyne, 3-thiamorpholinopropyne, 3-dimethylamino-3-methylpropyne, 3-diethylamino-3-methylpropyne, 3-morpholino - 3 - methylpropyne, 3-dimethylamino - 3 - isopropylpropyne, 3-morpholino-3-isopropylpropyne, 3-dimethylamino-3-hexylpropyne, 3-dimethylamino-3-(3)-heptyl)propyne, 3-diethylamino-3-heptylpropyne, 3-dimethylamino - 3-(2,4,4 - trimethylpentyl)propyne, 3 - morpholino-3-(2,4,4 - trimethylpentyl) - propyne, etc. Aminopropynes of this type are available through condensing a secondary amine, $R^2R^3NH$, with an aldehyde, $R^1CHO$, and acetylene in the presence of a copper catalyst.

There follow examples which are illustrative of methods of preparation of typical compounds of this invention. Parts are by weight unless otherwise designated.

Example 1

A solution of 182.08 parts of benzophenone in 355 parts of ethyl ether was treated with 173.5 parts of powdered potassium hydroxide. The resulting suspension was cooled to 130° C. and, while it was kept between 13° and 15° C., there was added 83.1 parts of dimethylaminopropyne over a period of one hour. The reaction mixture was stirred for 16 hours with the temperature at 35° C. It was poured onto ice. The solid which separated was filtered off and air-dried. The crude product thus obtained amounted to 183 parts. It was recrystallized twice from benzene and then melted at 145.5°–146° C. This product was 1,1 - diphenyl-4-dimethylamino-2-butyne-1-ol. By analysis the product contained 5.38% of nitrogen (theory 5.28%).

Example 2

One gram mole of sodium amide was prepared in two liters of liquid ammonia in accordance with the method of Vaughan and Niewland (J. Am. Chem. Soc., 56, 2120 (1934)). Thereto was added dropwise with stirring 83.1 grams (one mole) of 3-dimethylaminopropyne. There was then added 18.2 grams (one mole) of benzophenone. The mixture was then stirred for 16 hours, during which time the ammonia evaporated. The reaction mixture was cooled and treated with 355 parts of ethyl ether and with cold water. A solid precipitated and was filtered off. The ether layer was washed twice with water and evaporated to yield an additional amount of solid product. The solid was recrystallized from benzene to yield 100 grams of colorless, fluffy, needle crystals, which corresponded in composition to 1,1 - diphenyl - 4 - dimethylamino-2-butyne-1-ol. This product is a valuable chemical intermediate.

Example 3

Four gram moles of sodamide were prepared in liquid ammonia, starting with 92 grams of sodium. Thereto was added dimethylaminopropyne in an amount of 415.5 grams. The resulting mixture was stirred for four hours. Thereto was added an ether slurry of 1004.4 grams of 4,4' - dichlorobenzophenone along with 83.1 grams of dimethylaminopropyne. The reaction was stirred for two hours. There was then added a liter of anhydrous ether and the mixture was continuously stirred for 60 hours. Ammonia was evaporated from the reaction mixture. The mixture was cooled and treated with ice-water. A solid formed, consisting of unreacted ketone and product. The solid was separated, slurried in four liters of water, treated with 20% hydrochloric acid, and heated to 70°–75° C. The slurry was filtered while still hot to remove ketone. The filtrate was cooled to 0° C. and rendered alkaline. The product separated, was filtered off, and was washed with water. It was recrystallized from ethyl alcohol to yield 644 grams of colorless needles which melted at 165°–166° C. and corresponded in composition to 1,1-di-p-chlorophenyl-4-dimethylamino-2-butyne-1-ol. The crystalline product contained by analysis 4.2% of nitrogen (theory 4.2%). It was fungicidally active and was found to be insecticidal to Mexican bean beetle larvae.

In the same way there is prepared 1,1-di-p-bromophenyl-4-dimethylamino-2-butyne-1-ol.

Example 4

There was prepared as above a mole of sodium amide in two liters of liquid ammonia. Thereto was added 111 grams of 3-diethylaminopropyne, followed by 210 parts of bis(methylphenyl) ketone. The reaction mixture was stirred for 20 hours. Ethyl ether was then added and ammonia was evaporated. The mixture was cooled and treated with ice and water. The resulting solid was filtered off and recrystallized from benzene to give colorless monoclinic crystals which corresponded in composition to 1,1-bis-methylphenyl-4-diethylamino-2-butyne-1-ol.

The comparable ethylphenyl homologue is prepared in the same way and closely resembles the above methylphenyl derivative. Both have fungicidal properties.

Example 5

A mixture of 435 parts of xylene and 27 parts of n-butanol was heated to boiling and stirred while 143 parts of potassium hydroxide in pellet form was added. The mixture was slowly cooled with rapid stirring to give a suspension of potassium hydroxide. This was cooled with an ice-bath and slowly treated with 63.5 parts of 3-morpholinopropyne. Then 128 parts of 4,4'-dichlorobenzophenone was added. This reaction mixture was stirred for 16 hours at room temperature. It was then cooled and treated with ice-water. Two layers formed and were separated. Addition of water to the xlene phase caused precipitation of a solid, which was collected on a filter. The remaining xylene solution was dried over anhydrous sodium sulfate and evaporated to yield a white solid, which was combined with the filtered solid. This product was recrystallized from benzene to give a solid melting at 142°–144° C. It contained by analysis 18.8% of chlorine and 3.7% of nitrogen, thus corresponding to 1,1 - di(p-chlorophenyl)-4-morpholino-2-butyne-1-ol, which has a theoretical chlorine content of 18.8% and nitrogen content of 3.7%.

This compound has fungicidal properties against such organisms as *Sclerotinia fructicola* and *Macrosporium sarcinaforme* and exhibits stomach poison action against varied chewing insects.

In the same way there can be prepared the comparable pyrrolidino- and piperidino-derivatives. These behave in essentially the same way as the above morpholino compound.

Example 6

A gram mole of potassium amide was prepared in two liters of liquid ammonia. Thereto was slowly added a mole (83 grams) of dimethylaminopropyne with stirring, followed by addition of 242 grams of bis(methoxyphenyl) ketone. The reaction mixture was stirred 20 hours, then treated with a liter of ethyl ether, and stirred for 20 hours. Cold water was added. The solid which formed was filtered off and recrystallized from alcohol. It corresponded in composition to 1,1-di-(methoxyphenyl)-4-dimethylamino-2-butyne-1-ol. The yield of this product was 27%.

Example 7

There was prepared as above 0.241 mole of sodamide in liquid ammonia and thereto was added 73.8 grams of 3-octyl-3-dimethylamino-1-propyne. This mixture was stirred for 48 hours, during which time the ammonia evaporated. The residue was cooled and ether was added. Water was then stirred into the reaction mixture. A little unchanged ketone separated and was removed by filtration. The ether and water layers were separated. The aqueous layer was extracted with ether, which was added to the original ether layer. The ether solution was then dried over sodium sulfate and evaporated to yield a mixture of a solid and an oil, which were separated. The solid was identified as unchanged dichlorobenzophenone.

From the oil there was obtained another solid which melted at 136°–138° C. after recrystallization from naphtha. This product contained by analysis 15.5% of chlorine and 3.1% of nitrogen, corresponding in composition to 1,1-di(p-chlorophenyl)-4-(2,4,4-trimethylpentyl)-4-dimethylamino-2-butyne-1-ol,

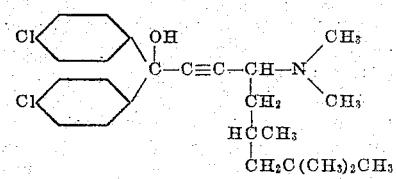

The theoretical chlorine content of this compound is 15.7% and the theoretical nitrogen content is 3.1%. This compound also exhibits fungicidal properties.

Example 8

A mixture of 345 parts of xylene and 22 parts of n-butanol was heated to boiling and 115 parts of potassium hydroxide was added. The mixture was vigorously stirred to disperse the potassium hydroxide and cooled while stirring was continued. There was added 83 parts of dimethylaminopropyne and then 216 parts of chloro-phenyl phenyl ketone. The reaction mixture was stirred for 48 hours. It was then treated with ice and water. The organic and aqueous layers which formed were separated. The organic layer was further treated with water. A solid formed and was separated by filtration. The filtrate was dried and evaporated to yield a solid, which was further purified to increase the yield of product. The solid material was recrystallized from benzene to yield 1-phenyl-1-p-chlorophenyl-4-dimethylamino-2-butyne-1-ol. This compound has some fungicidal action and exhibits some contact poisoning value against soft-bodied insects.

The diphenylaminobutynols of this invention are valuable intermediates for the preparation of other new chemical compounds. They yield with anhydrides or acids interesting esters and with alkylating agents useful quaternary ammonium salts. Upon hydrogenation the butynols of this invention pass through olefinically unsaturated aminoalcohols to yield diphenylaminobutanols.

This reaction is readily carried out in the presence of a hydrogenation catalyst such as Raney nickel by addition of hydrogen under pressure. Some typical reductions of this sort follow.

Example 9

A solution of 26.5 parts of 1,1-diphenyl-4-dimethylamino-2-butyne-1-ol in 160 parts of ethanol was treated with hydrogen at 780 p. s. i. in the presence of five parts of Raney nickel. The reaction mixture was warmed, the highest temperature reached being 50° C. When hydrogen was no longer taken up, the pressure was released and the product isolated in the form of colorless needles which melted at 122°–123.5° C. The product was recrystallized from benzene, but the melting point remained the same. The crystals corresponded in composition to 1,1-diphenyl-4-dimethylamino-1-butanol.

Example 10

A dioxane solution of 33.4 parts of 1,1-di-(p-chlorophenyl)-4-dimethylamino-2-butyne-1-ol was heated to 90°–117° C. in the presence of three parts of Raney nickel under hydrogen at an initial pressure of 1200 p. s. i. The theoretical amount of hydrogen was absorbed in 3.5 hours. The reaction vessel was cooled and the solution therefrom was filtered. Upon evaporation of the solvent a crystalline residue was obtained. This was slurried with heptane. The slurry was filtered and air-dried. A white solid melting at 115°–118° C. was obtained. It corresponded in composition to 1,1-di(p-chlorophenyl)-4-dimethylamino-1-butanol, containing by analysis 20.7% of chlorine and 4.1% of nitrogen, the theoretical values being 20.9% and 4.1% respectively. This compound is a powerful fungicide and has some contact insecticidal action.

Example 11

A dioxane solution of 37.6 parts of 1,1-di-(p-chlorophenyl)-4-morpholino-2-butyne-1-ol was mixed with about five parts of Raney nickel and heated up to about 100° C. under hydrogen at an initial pressure of 1000 p. s. i. When hydrogen was no longer absorbed, the reaction vessel was cooled and vented. Catalyst was filtered off and solvent was evaporated to yield an oil which slowly solidified. It was taken up in naphtha, a gummy, insoluble material was removed by filtration, and the product was crystallized to yield 25 parts of colorless needle crystals which melted at 123°–125° C. This product contained 18.1% of chlorine and 3.6% of nitrogen, corresponding in composition to 1,1-di(p-chlorophenyl)-4-morpholino-1-butanol, which has theoretical chlorine and nitrogen contents of 18.6% and 3.7% respectively.

The above saturated compounds are even more potent fungicides than the starting butynols. They yield esters and quaternary ammonium salts which retain fungicidal action.

We claim:

1. Compounds of the formula

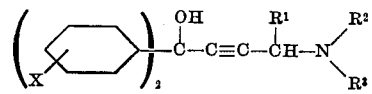

wherein $R^1$ is a member of the class consisting of hydrogen and alkyl groups of not over eight carbon atoms, $R^2$ and $R^3$ are alkyl groups of not over two carbon atoms when taken individually and when taken together $R^2$ and $R^3$ form a saturated divalent group from the class consisting of —CH₂CH₂CH₂CH₂—, —CH₂CH₂CH₂CH₂CH₂—
—CH₂CH₂OCH₂CH₂—, and —CH₂CH₂SCH₂CH₂— groups, and X is a member of the class consisting of hydrogen, chlorine, bromine, an alkyl group of not over two carbon atoms, and the methoxy group.

2. A compound of the formula

3. A compound of the formula

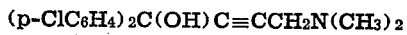

4. A compound of the formula

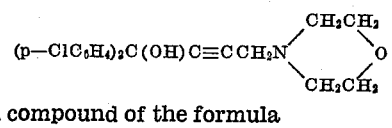

5. A compound of the formula

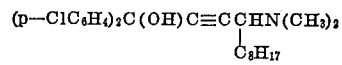

where the C₈H₁₇ group is the 2,4,4-trimethylpentyl group.

WILLARD J. CROXALL.
JOHN W. DAWSON.

No references cited.